Patented May 20, 1947

2,420,911

UNITED STATES PATENT OFFICE 2,420,911

METHYL VINYL POLYSILOXANE-METHYL METHACRYLATE COPOLYMERS

George F. Roedel, Schenectady, N. Y., assignor to General Electric Company, a corporation of New York No Drawing. Application June 11, 1945,
Serial No. 598,911

5 Claims. (Cl. 260—84)

The present invention relates to novel copolymers of a methyl vinyl polysiloxane and methyl methacrylate.

The copending application Serial No. 598,928, filed concurrently herewith in the name of Dallas T. Hurd, and assigned to the same assignee as the present invention, describes and broadly claims copolymers of various polymerizable organic compounds and hydrocarbon-substituted polysiloxanes containing silicon-bonded alkenyl groups.

The present invention is based on the discovery that particularly useful resinous products can be obtained by copolymerizing a methyl vinyl polysiloxane of the general formula

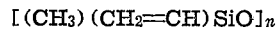

wherein $n$ is equal to at least 3 and each silicon atom is connected to both a methyl and a vinyl radical, with methyl methacrylate in proportions such that the copolymers contain from about 30 to 60 per cent by weight of the polysiloxane.

The methyl vinyl polysiloxanes employed in the practice of the present invention may be prepared, for example, by the hydrolysis of a methyl vinyl dichlorosilane which in turn can be obtained by the chlorination and subsequent dehydrochlorination of an ethyl methyl dichlorosilane. Sulfuryl chloride has been found to be a suitable chlorinating agent for ethyl methyl dichlorosilane, while the chloroethyl product can be converted to the corresponding vinyl-substituted silane by heating with an excess of 2,4-lutidine or other suitable amine.

In carrying the present invention into effect, the liquid methyl vinyl polysiloxane is mixed with the methyl methacrylate in the desired proportions and the resultant mixture polymerized, preferably in the presence of a small amount, generally about 0.5 to 1.0 per cent, of a polymerization catalyst such as benzoyl peroxide, tertiary butyl perbenzoate, ditertiary butyl diperphthalate, ditertiary butyl peroxide, or other peroxide catalysts. It has been found that the character of the polymeric product depends on whether or not a catalyst has been employed and, if a catalyst has been employed, on the nature of the catalyst as will be shown from the following description of the invention.

In general the conversion of the mixture of methyl vinyl polysiloxane and methyl methacrylate to a partial or completely solidified state is carried out at elevated temperatures not exceeding about 100 to 125° C., preferably employing temperatures of from 60 to 80° C. at the start of polymerization.

The properties of the solid products and the effect of specific catalysts on these properties will be apparent from the following table in which the compositions of copolymers coming within the scope of the present invention are given in per cent by weight of the copolymer:

| Copolymer of— | | Hardness | |
|---|---|---|---|
| Methyl Vinyl Polysiloxane | Methyl Methacrylate | Benzoyl Peroxide Catalyzed | Tertiary Butyl Perbenzoate Catalyzed |
| 60 | 40 | 48–51 | 46–49 |
| 50 | 50 | 64–67 | 55–60 |
| 46 | 54 | 66–70 | 60–65 |
| 40 | 60 | 70–75 | 52–57 |
| 30 | 70 | 76–80 | 85–90 |

The hardness values given in the above tables were obtained with a Shore sceleroscope. In general the hardness increases with increase in the methyl methacrylate content of the copolymer when benzoyl peroxide is employed as the catalyst. On the other hand, when tertiary butyl perbenzoate is employed as a catalyst, the hardness of the copolymers passes through an acceptable minimum as the methacrylate content thereof ranges from 40 to 70 per cent by weight. In this connection it has been found that copolymers prepared for example with tertiary butyl perbenzoate as the catalyst and containing less than 40 per cent by weight of methyl methacrylate are harder than those listed in the above table and are characterized by a brittleness which increases with increased methyl vinyl polysiloxane content. While the toughness of the copolymer prepared either by means of benzoyl peroxide or tertiary butyl perbenzoate increases with the methacrylate content of the copolymer, products containing more than about 70 per cent by weight of the methacrylate are thermoplastic rather than thermosetting. For example, whereas copolymers containing from 40 to 70 per cent by weight of the methyl methacrylate are hard at a temperature of 175° C., copolymers containing more than 70 per cent methacrylate have been found to be quite soft at such elevated temperatures. Copolymers in the proportions given in the above table have been found to have very good craze life at elevated temperatures in the neighborhood of 175° C. For example, a 50–50 polymer showed no crazing and only a negligible loss in weight when held at 175° C. for 250 hours.

That the products of the present invention are true copolymers is indicated by the clarity of the solid materials and the fact that only small amounts of extractable materials are obtained when the finely divided solid copolymers are subjected to solvent extraction with acetone or the like.

Electrical tests on the solid polymers have shown them to be particularly adapted for use in the insulating field. For example, a copolymer of 46 per cent by weight of methyl vinyl polysiloxane and 54 per cent by weight of methyl methacrylate was found to have a power factor of 0.033 at 25° C. and 0.005 at 150° C. Its dielectric constant at 25° C. was 4.13 and at 150° C. was 4.66, while the loss factors at these two temperatures were respectively 0.134 and 0.024. These electrical measurements were made at 60 cycles.

The preferred copolymers coming within the scope of the present invention are those containing about 46 per cent by weight of methyl vinyl polysiloxane and 54 per cent by weight of methyl methacrylate, which proportions coincide with the unsaturation equivalent amounts of these two materials. As is evident from the foregoing description of the invention, when the amount of methyl vinyl polysiloxane is increased above 60 per cent by weight, the craze and crack resistance of the copolymers is low and the products are either too soft as in the case of the benzoyl peroxide catalyst, or too hard and brittle in the case of the tertiary butyl perbenzoate catalyzed masses. On the other hand when the methyl vinyl polysiloxane is less than 30 per cent by weight, the copolymer exhibits the thermoplastic properties of the methyl methacrylate component to an undesirable extent. Maximum clarity in the solid products is obtained when the two materials are copolymerized in unsaturation equivalent proportions.

What I claim as new and desire to secure by Letters Patent of the United States is:

1. A resinous copolymer which is the product of polymerization of a mixture of (1) liquid methyl vinyl polysiloxane in an amount corresponding to from 30 to 60 per cent by weight of said mixture and (2) methyl methacrylate, said ingredients of (1) and (2) being copolymerizable.

2. A resinous copolymer which is the product of polymerization of a mixture of (1) liquid methyl vinyl polysiloxane in an amount corresponding to about 46 per cent by weight of said mixture and (2) methyl methacrylate, said ingredients of (1) and (2) being copolymerizable.

3. The method of preparing a resinous material which comprises heating at an elevated temperature a mixture of (1) liquid methyl vinyl polysiloxane and (2) methyl methacrylate while admixed with a peroxide catalyst, thereby to copolymerize said polysiloxane and methacrylate, said mixture containing from 30 to 60 per cent by weight of said methyl vinyl polysiloxane, said ingredients of (1) and (2) being copolymerizable.

4. A method as in claim 3 wherein the peroxide catalyst is benzoyl peroxide.

5. A method as in claim 3 wherein the peroxide catalyst is tertiary-butyl perbenzoate.

GEORGE F. ROEDEL.